United States Patent [19]

Corderman

[11] 3,803,359

[45] Apr. 9, 1974

[54] EQUALIZATION SYSTEM FOR POWER AMPLIFIER AND LOUDSPEAKER SYSTEM

[75] Inventor: Sidney A. Corderman, Binghamton, N.Y.

[73] Assignee: McIntosh Laboratory Inc., Binghamton, N.Y.

[22] Filed: Mar. 15, 1973

[21] Appl. No.: 341,376

Related U.S. Application Data

[62] Division of Ser. No. 151,123, June 8, 1971.

[52] U.S. Cl. .................... 179/1 D, 330/21, 330/107, 333/28 T

[51] Int. Cl. .......................... H03h 7/14, H03g 5/02

[58] Field of Search ...... 333/28 R, 28 T; 330/38 M, 330/107, 109; 179/1 D

[56] References Cited

UNITED STATES PATENTS

| | | | |
|---|---|---|---|
| 3,444,474 | 5/1969 | Borenstein et al. | 333/28 R X |
| 3,624,298 | 11/1971 | Davis et al. | 333/28 R X |
| 3,715,501 | 2/1973 | Russell | 179/1 D |

*Primary Examiner*—Paul L. Gensler
*Attorney, Agent, or Firm*—Hyman Hurvitz

[57] ABSTRACT

A loudspeaker system which includes a loudspeaker and a drive, the loudspeaker being in an enclosure having a Q of 0.5 or less at a frequency well within the audio band, resulting in rapid rolloff from a frequency well above resonance to about 20 Hz, where cut-off is provided for. The drive has voltage compensation for the rolloff of the speaker, and the latter is directly driven by an amplifier which it sees as a voltage source. Cascaded environmental equalizing circuits are provided, which provide 0, ± 2 and ± 4 db of mid-frequency (4KC) and of high frequency (20KC) equalization, additional to the low frequency voltage equalization, and the latter is adjustable. Provision is made for delayed application of audio signal to the loudspeakers in the system until voltages have stabilized, to avoid high level transient impulses to the speaker.

1 Claim, 7 Drawing Figures

EQUALIZATION SYSTEM FOR POWER AMPLIFIER AND LOUDSPEAKER SYSTEM

This is a division of application Ser. No. 151,123, filed June 8, 1971.

BACKGROUND

This application is related to an application for U. S. Pat. Ser. No. 873,264, filed Nov. 3, 1969 , now U.S. Pat. No. 3,715,501, which is assigned to a common assignee herewith. That application presents in block form the present system, minus some of its refinements, such as provision for environmental equalization and protection of speakers against transients. This application discloses the circuitry appropriate to the prior application.

In a loudspeaker, the relationship between cone displacement and driving force that moves the cone, must be a straight line, if natural sound is to ensue. Any departure from linearity results in departure from perfect reproduction. But even worse, any departure from linearity produces distortion, which in terms of percentage of the original signal is a function of non-linearity. Further to avoid distortion, the cone of the speaker must move as a piston at all frequencies, i.e., the entire surface of the cone must move the same distance in the same time. If one part of the cone moves differently from another part, called breakup, distortion occurs.

Heretofore, perfect piston cones have been avoided, because such cones must be stiff, and to achieve stiffness involves weight of cone. Weight of cone dictates frequency range of the cone, i.e., as weight goes up stiffness increases, but frequency range and speaker efficiency in converting electrical energy to acoustic energy, decreases. In the low frequency speaker of the present system, the cone and drive coil assembly have an effective moving mass of 55 grams. Frequency of drive of a loudspeaker is proportional to acceleration of its cone and coil. For example, at 60 Hz, with a 12 inch loudspeaker producing 1 acoustic watt, maximum acceleration is 93 grams, which requires great electrical power. In the present system, the low frequency speaker cuts off at 250 Hz.

Another problem faced in designing loudspeakers, is that of radiation patterns. If the wave length to be radiated is long in relation to loudspeaker diameter, intensity of sound is the same all around the speaker, i.e., front, back, sides, above and below. Wave length decreases from 55 feet at 20 Hz to ½ inch at 20 KHz. To achieve widely dispersed radiation patterns loudness is lost, and enough speakers must be employed so that the shortest wave length radiated is at least comparable to loudspeaker diameter.

As wave length shortens, a speaker becomes more and more directional, until its pattern breaks up into major and minor lobes. For example, as pitch increases from 1,500 Hz to 3,000 Hz a listener 30° off axis would hear sound of greatly reduced intensity. The brain localizes stereo sounds by means of cues, which include relative intensities from the stereo speakers. As pitch varied then, the listener who is off-axis would obtain the impression of a moving sound source, because the radiation pattern changes. Changes of intensity of the order of 25 db can occur. The problem is avoided by employing many loudspeakers of differing diameters. A 12 inch speaker may be limited to 300 Hz, a smaller speaker extend the range to 1,500 Hz, another to 7,000 Hz, etc. Limiting frequency range per speaker allows piston-like operation, so that better sound imaging and better stereo imaging, and less distortion, all require limiting individual speakers to sub-bands of the total audio spectrum, and the improvement accrues throughout a room, and not only axially of the speakers. Stereo imaging pertains to separation of instruments and their definition and localization.

Having designed a loudspeaker which is linear with frequency down to 20 Hz, and which radiates spherically, it is found that location of the loudspeaker in a room causes power output to vary by as much as 9 db. For example, if a loudspeaker is suspended mid-room it radiates spherically, but if it is on the floor it does not, due to reflections from the floor. Such reflections double loudness. Location against a wall again doubles loudness, and location in a corner adds 3 db. Provision is made in the present system to adjust bass compensation for room location of the loudspeaker. Further provision is made, at mid and treble frequencies, for the effects of drapes, reflecting walls and floors, rugs and the like, by enabling ±2½ and ±5 db of gain or loss in these ranges.

SUMMARY

A loudspeaker system designed for (1) flat bass response to 20 Hz, (2) wide angle radiation patterns at all frequencies, (3) piston-like speaker cones, (4) essentially no intermodulation distortion, (5) compensation for room location, and room reflectivity, for mid-range and treble frequencies, (6) adequate cone travel (¾ inch to 1inch) in the bass to move the required volume of air for an effective 10 inches radiator, (7) high efficiency speaker with overdamping at a frequency within the audio band, achieved by electrical and acoustic damping in terms of magnet and coil design and of small enclosure volume per speaker.

DETAILED DISCLOSURE

All the loudspeakers of the present system are connected across lines 10, 11, and speakers of each size are associated with appropriate cross-overs. LS1–LS4, inclusive, are 12 inch loudspeakers, connected in parallel pairs. A filter coil L1 is connected between line 10 and the speakers LS1–LS4, and a series CR by-pass for high frequencies across the speakers. The D.C. resistance of L1 is important, in that the power amplifier connected between lines 10 and 11 must have a low internal resistance, in order to appear as a voltage source to its load, and the D.C. resistance of L1 must be very small, at least by a factor of 1:10, relative to the D.C. resistance of the speaker, or about 0.8 ohms. Similarly, its reactance must be small relatively to speaker coil reactance in the pass band. The speakers are labelled as to size, and the frequency bands they radiate, and cross-over filter components are identified, all on the drawings. The requirement that the loudspeaker be directly connected to a low impedance amplifier applies stringently only to the speakers LS1–LS4, inclusive, since for the remaining speakers there is no necessity to move large volumes of air, and power is much smaller than at low frequencies.

Since the Left and Right sides of the present system are identical, only one side is illustrated and described.

Figure 2:
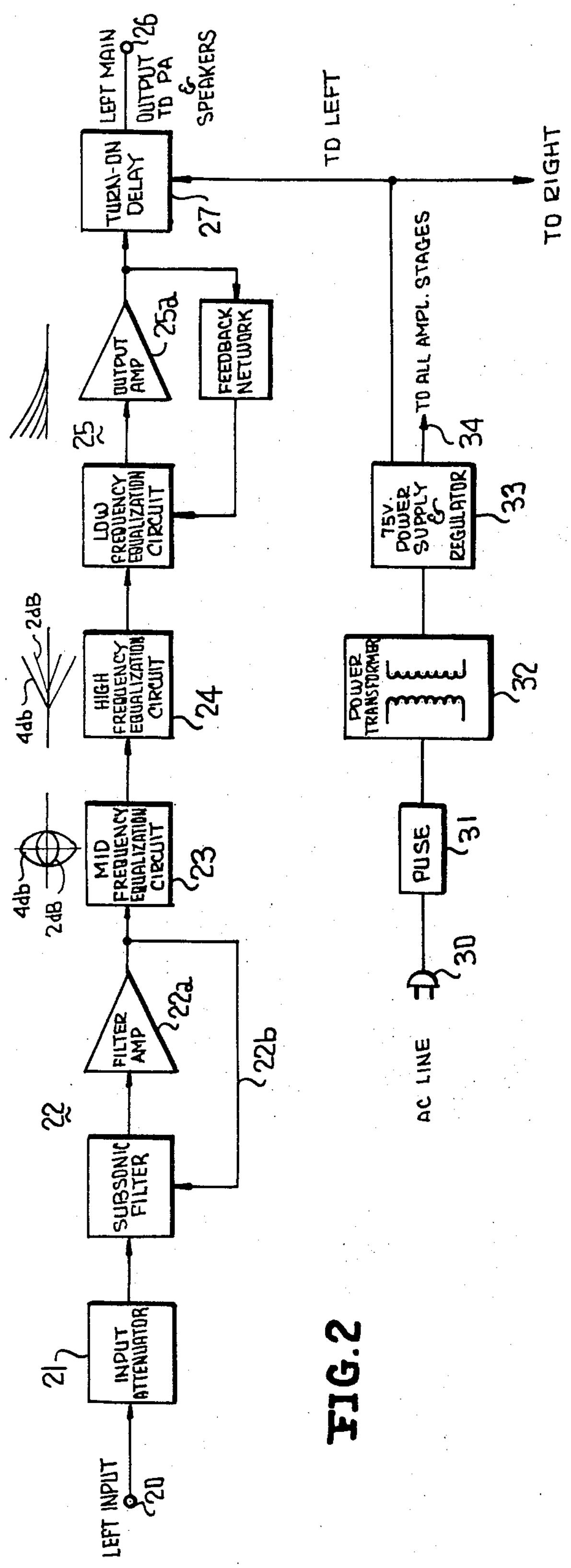
FIG. 2 is a block diagram of a drive system for the loudspeakers.
Figure 1:
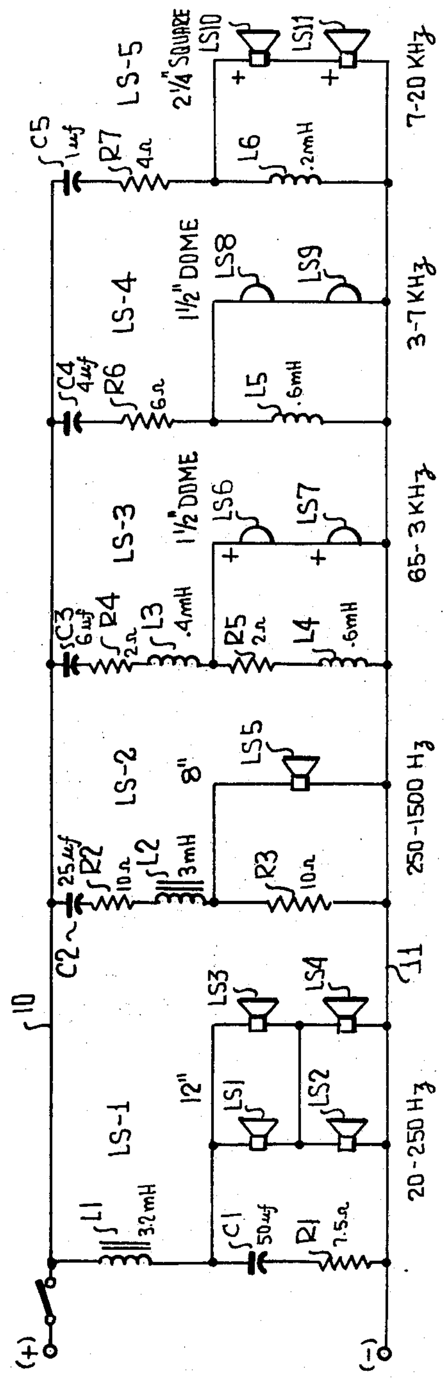
FIG. 1 is a circuit diagram of a loudspeaker-cross over arrangement according to the present invention.

In FIG. 2, audio signal is applied to a terminal 20, whence it proceeds to input attenuator 21, and when at a desired level to a sub-sonic high pass filter 22 having a sharp cut-off at 20 Hz. The filter 22 is of the active type including an amplifier 22*a* and a feedback path 22*b*. The output of filter 22*a* proceeds to a mid-frequency equalization circuit 23, which boosts or lowers signal level over a band centered at 4 KC. The circuit 23 provides five positions; flat, + 2db, + 4db, – 2 db and – 4 db.

The circuit 23 feeds in cascade to a high frequency equalization circuit 24 providing variable rolloff of 0 db, + 2db, + 4db, – 2db and – 4db up to 20 KC.

The circuit 24 feeds a low frequency equalization circuit 25, represented by an active filter composed of an amplifier 25*a* and a feedback network 25*b*. The circuit 25 in turn feeds an output terminal 26 via a turn on relay 27, which provides delay in applying voltage.

The power supply of the system includes a plug 30, a fuse 31 in series with the plug 30, a power transformer 32, which drives a 75 V power supply and regulator 33, which in turn supplies all amplifier stages of the system via lead 34, and also supplies power to turn on delay system 27.

FIGURE 3

Figure 3:
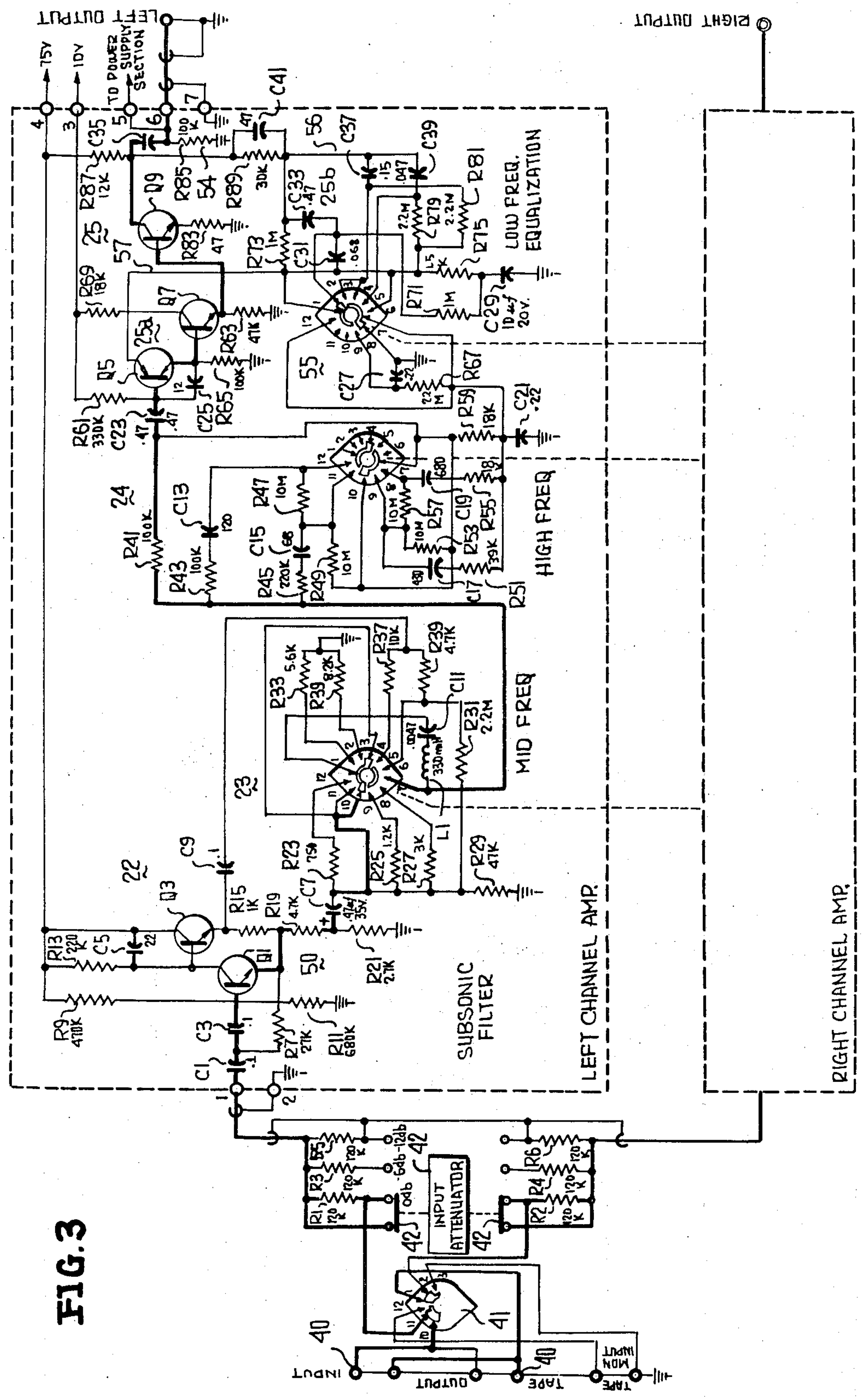
FIG. 3 is a schematic circuit diagram of the system according to FIG. 2.

In FIG. 3 terminals 40, represent possible input terminals, as labelled, which can be selected by switch 41 and applied to attenuators 42. In the position illustrated all attenuator resistances R1–R6 are shorted, but as bars 42 move to the right attenuation increases, values of attenuation in db being illustrated. The attenuated output signal for the left channel is ignored as duplicative.

Figure 5:
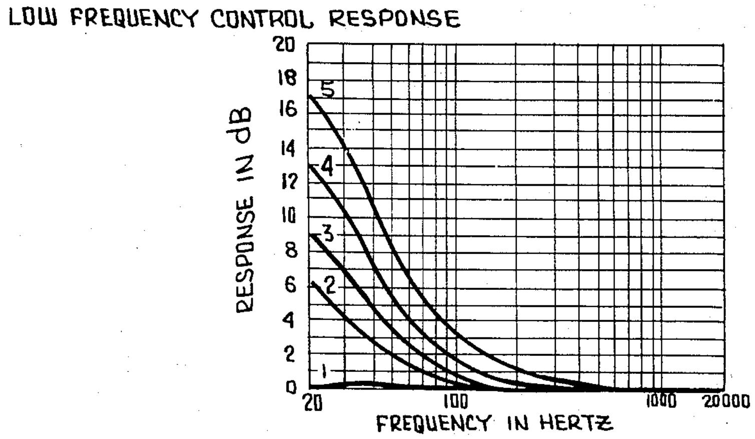
FIGS. 5 – 7 are, respectively, curves of available responses in DB for various settings of equalization switches, in the system of FIGS. 2 – 4.
Figure 6:
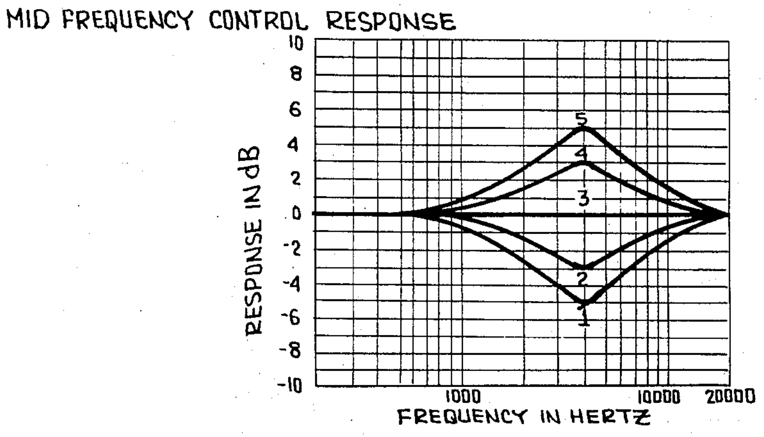
Figure 7:
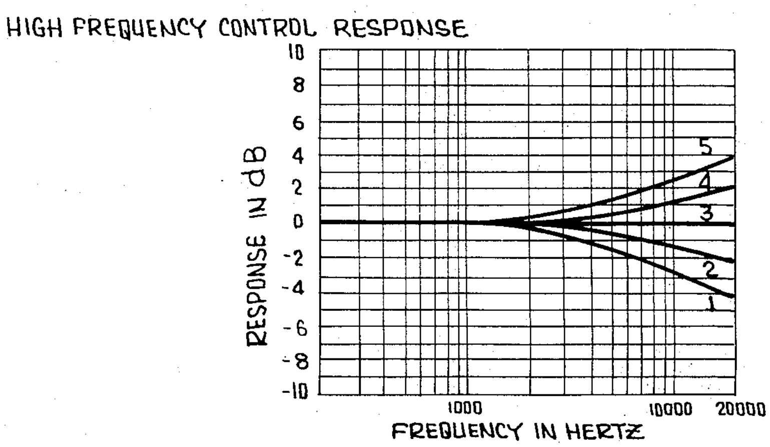

The signal proceeds to active high pass filter 22, designed to have sharp cut-off at 20 Hz. Design of filter 22 is conventional, and its output at low impedance level is taken from emitter loads 50, for application to variable step attenuator 23, which provides a range of equalization curves, as illustrated in detail in FIG. 6. The output of attenuator 23 proceeds to attenuator 24, which provides a range of attenuator curves as illustrated in FIG. 7, and the output of equalizer 24 is applied to active filter 25*a* having a variable feedback network 25*b*, which establishes the five attenuation curves of FIG. 5. In amplifier 25, signal is applied to the base of Q5 which is collector coupled to the base of Q7. The latter is emitter coupled to the base of Q9, having a collector load 54. The output of Q9 is the left output of the equalizer of FIG. 3. The amplifier 25 includes a feedback path adjustable by means of switch 55, the path extending from the collector of Q9 via lead 56, the various KC circuits of feedback path 25b, and back to the emitter of Q5 via lead 57. The filter 25 is per se well known, and therefore does not merit detailed discussion.

FIG. 4

Figure 4:
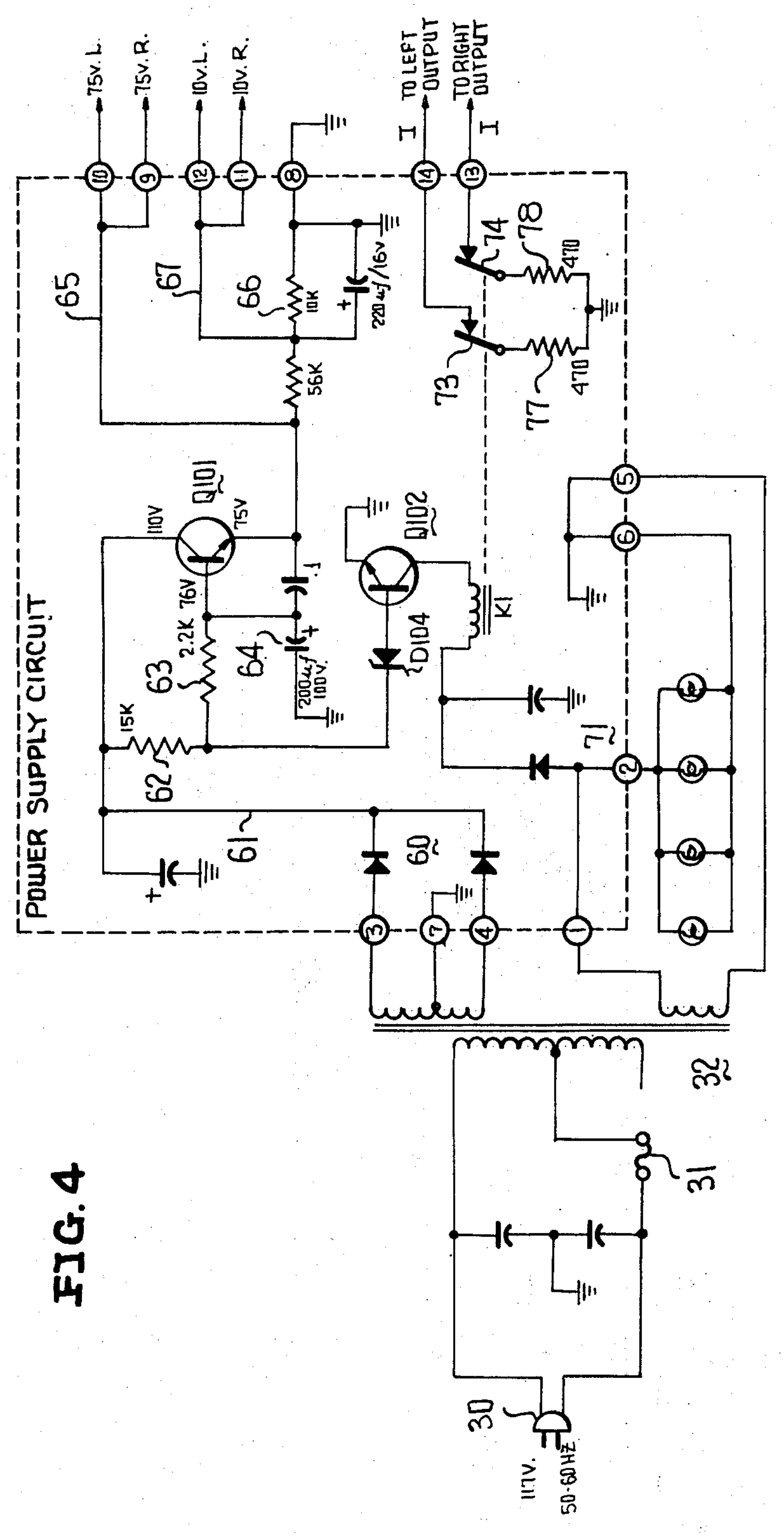
FIG. 4 is a schematic circuit diagram of a power supply for the system of FIG. 2, including a time delay circuit.

In FIG. 4, the transformer 32 supplies ac voltage to full wave rectifier 60, which provides dc output voltage at lead 61. The latter is connected via resistances 62 and 63 to large capacitor 64. Transistor Q101 is normally non-conductive, absent voltage, since both its emitter and base are grounded. But as the capacitor 64 changes, the voltage of the base of Q101 rises and the transistor becomes conductive supplying voltage to output lead 65 at 75. V. and via a voltage divider 66 to leads 67 at 10. V.

The voltage at the junction of resistances 62, 63, is applied to the base of transistor Q102, which has a grounded emitter, via Zener diode D104. The collector of Q102 is connected in series with a relay coil K1 and is supplied with voltage from a rectifier power supply 71. The relay coil K1 actuates switch contacts 73, 74, which normally are closed and ground the inputs I to the power amplifiers of the system. When ac power is applied to the system the collector of Q102 goes positive immediately. However the base of Q102 is isolated by the Zener diode D104 and the relay K1 remains unenergized. When the voltage at the junction of resistances 62, 63 rises to a sufficient value, as capacitor 64 charges, Zener D104 breaks down, transistor Q102 becomes conductive, and coil K1 energizes, pulling ground off output leads and permitting the power amplifier of the system to operate. The time constant involved is about 4 seconds. If power fails, the contacts 73, 74, immediately close, and when power comes on again, again require 4 seconds to open. Thereby, transient sounds and impulses applied to the loudspeakers are reduced. If desired leads I can proceed directly to loudspeakers, as an alternative system, since contacts 73, 74, are connected to ground via resistances 77, 78, which supply loads for the power amplifier, until conditions stabilize after application of power to the system. In the present system, the circuit of FIG. 3 is called an environmental equalizer, and it feeds a pre-amplifier, power amplifier and loudspeaker, and constitutes a unit not present in prior art high fidelity systems. The primary function of this system is to compensate for speaker placement and room environmental conditions.

What I claim is:

1. An environmental equalizer for a power amplifier and loudspeaker system, comprising a cascade of equalizer sections, including a first high pass active filter section providing sub-sonic cut off and a series of discrete gains and attenuations, including zero gain, a second section providing selective mid-frequency step-wise attenuation and gain, a third section providing selective high frequency step-wise attenuation and gain, said high pass active filter being arranged to provide low frequency equalization from about 20 Hz at about 12 db per octave for a portion of the equalization curve, and values at 20 Hz of 17, 13, 9 and 6 db.

* * * * *